United States Patent
Segal et al.

(10) Patent No.: US 6,496,941 B1
(45) Date of Patent: Dec. 17, 2002

(54) NETWORK DISASTER RECOVERY AND ANALYSIS TOOL

(75) Inventors: Moshe Segal, Tinton Falls, NJ (US); Martin Eisenberg, Holmdel, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/316,497

(22) Filed: May 21, 1999

Related U.S. Application Data

(60) Provisional application No. 60/114,349, filed on Dec. 29, 1998.

(51) Int. Cl.[7] ................................................ G06F 11/00
(52) U.S. Cl. .......................................... 714/4; 709/235
(58) Field of Search .............................. 714/4; 709/235, 709/223, 229, 102, 239

(56) References Cited

U.S. PATENT DOCUMENTS

| | | | |
|---|---|---|---|
| 4,665,520 A | | 5/1987 | Strom et al. |
| 4,769,810 A | * | 9/1988 | Eckberg et al. ............. 370/232 |
| 4,999,829 A | * | 3/1991 | Fite et al. ................... 370/218 |
| 5,436,903 A | | 7/1995 | Yang et al. |
| 5,444,693 A | | 8/1995 | Arslan et al. |
| 5,459,716 A | | 10/1995 | Fahim et al. |
| 5,638,359 A | | 6/1997 | Peltola et al. |
| 5,675,578 A | | 10/1997 | Gruber et al. |
| 5,732,206 A | * | 3/1998 | Mendel .......................... 714/4 |
| 5,734,654 A | | 3/1998 | Shirai et al. |
| 5,768,271 A | | 6/1998 | Seid et al. |
| 5,771,228 A | | 6/1998 | Seetharam et al. |
| 5,778,058 A | | 7/1998 | Gavin |
| 5,825,861 A | | 10/1998 | Hoy |
| 5,887,127 A | * | 3/1999 | Saito et al. ..................... 714/4 |

* cited by examiner

Primary Examiner—Scott Baderman

(57) ABSTRACT

An embodiment of the system and method of the present invention organizes the recovery of a communications network to minimize the interference between the recovering nodes and thus allows for a faster recovery. A metered rate is calculated at which nodes recover from a major network failure; when nodes recover at the metered rate, the network recovers quickly but without performance degrading interference. A measure of the interference between recovering nodes may be created; the interference measure may be used to partition the network, where the nodes within each partition set interfere minimally with each other during recovery and each set recovers separately. Recovering items (nodes or sets) may be sequenced so that each item recovers substantially separately in time, but where adjacent sequence items recover with some temporal overlap. Alternate embodiments may organize any system of items such as objects or devices competing for resources to minimize interference; a metered rate or measure of interference may be created, and the items may be partitioned and sequenced.

27 Claims, 3 Drawing Sheets

NETWORK DISASTER RECOVERY AND ANALYSIS TOOL

PRIOR PROVISIONAL PATENT APPLICATION

The present application claims the benefit of U.S. Provisional Application No. 60/114,349, entitled "Network Disaster Recovery and Analysis Tool," filed Dec. 29, 1998.

TECHNICAL FIELD

This invention relates to communications networks. More particularly, this invention relates to an improved system and method for quickly recovering from failures or error conditions.

BACKGROUND OF THE INVENTION

A telecommunications network transports information from a source to a destination. The source and destination may be in close proximity, such as in an office environment, or thousands of miles apart, such as in a system transmitting credit card transaction data throughout the United States. The information (traffic), which may be, for example, computer data, voice transmissions, or video programming, usually enters and leaves a network at nodes (also termed backbone switches or offices), and is transported through the network via links and nodes. The overall traffic comprises multiple data streams which may be combined in various ways and sent on common links.

Nodes are devices or structures that direct traffic into, out of, and through a network. They can be implemented electronically, mechanically, optically, or in combinations thereof, and are known in the art. Nodes range in complexity from simple switching or relay devices to entire buildings containing thousands of devices and controls. Nodes in a network can be controlled by a central network operations center ("NOC") and can be programmed with varying degrees of automated traffic-managing capabilities. Links, which may be termed trunks, connect nodes and transmit data between nodes.

A node may become inoperative in a number of ways: for example, power outage, flood or an abnormal amount of messages flooding the network. A link can become inoperative in numerous ways, but most often becomes inoperative as a result of being cut. A network error condition or a network failure is any condition or occurrence that adversely affects the performance of a network or interrupts traffic flow; such a condition may affect only a portion of the network. For example, an error condition may be the failure of a link, a software or control failure, or an overload condition.

Because of the significant volume of traffic typically transported by a network, any disruption in traffic flow can be devastating to large numbers of users transmitting information. The ability to quickly restore network service should a portion of the network become inoperative is of high priority.

A frame relay network is a communications network which transmits data of variable length packets between two points. A frame relay network may accept data in a frame relay format, convert the data to asynchronous transfer mode ("ATM"), transmit the data in ATM form, and convert the data back to a frame relay form when the data leaves the network. ATM uses packets of a fixed length. Thus in such a network a variable length frame entering the network may be broken up into multiple packets of a set length, which are reassembled into the frame when the data leaves the network.

Traffic is routed through a network via a path, a physical or logical route between two points in a network. A path between any two nodes is a route allowing for data transmission between those two nodes; a path may be one link, or may be comprised of multiple links and nodes and other network elements. The length of a path is an indication of the amount of equipment comprising the path; for example, meters of fiber or number of hops (links separated by nodes). A network may transmit data via virtual circuits. A virtual circuit is a path transmitting data between two endpoints in a manner giving the appearance that a dedicated path exists between the two endpoints; in reality any of numerous paths, each path having multiple links and nodes, may be used to connect the two endpoints. For any number of reasons a network may reconfigure a virtual circuit, i.e., change the routing scheme of the virtual circuit.

In one frame relay network, users transmitting data may have a router at a user site for connecting with the frame relay network via an edge vehicle switch (located remotely from the user site) which in turn connects to a node in the network. A user sends data in frame relay form to the network via the router and edge vehicle switch.

The edge vehicle switch converts the data to packets of standard length. The packets are sent through the network via a virtual circuit. An edge vehicle switch connecting to one end of the virtual circuit converts the data to frame relay form and transmits the data to a router located at a user site.

A permanent virtual circuit ("PVC") is a virtual circuit having a path which is relatively stable over time. In one known network, each PVC is owned by a master node. The master node owning a PVC establishes, monitors, and maintains the PVC and is typically one of the two endpoint nodes for the PVC. Each node is responsible for allocating the capacity of the trunks directly connected to it. Most, if not all, nodes in such a network are both master nodes, owning many PVCs, and via nodes, part of many PVCs owned by other nodes. Establishing a PVC involves finding a path for the PVC. The master node determines a path based on its knowledge of network capacity and transmits requests to numerous potential via nodes in the network. A requested via node responds negatively to a request only if the master node is incorrect as to the trunk capacity allocated by the requested via node, and the trunks for which the requested via node is responsible do not have the capacity to participate in the PVC.

In such a network a failure of a network component, e.g., a node or link, affects multiple PVCs. For example, if one node fails, data cannot flow on the numerous PVCs which use that node as a via node. The affected PVCs must be rerouted: for each PVC the master node owning the PVC must select a set of nodes from the remaining healthy nodes in the network to re-form the PVC. This must be done quickly, and must be done for numerous PVCs, as the failure of even a single node or link may interrupt data transmission for many PVCs.

The reestablishment of a PVC requires the use of network resources such as the processing time of nodes and the communications resources of the network. In certain networks, on the occurrence of relatively small failures, e.g., the failure of two nodes in a 200 node network, master nodes may recover (i.e., reestablish their PVCs and perform other tasks) simultaneously without interfering significantly with each other's recovery. However, on the occurrence of a major disruption, for example, the failure of a majority of the nodes, the load on various network resources from recovering nodes results in interference between nodes trying to reestablish PVCs, which results in inefficiencies delaying overall network recovery.

As part of a node's recovery process, the node queries and receives responses from other nodes to determine whether the other nodes may become via nodes in PVCs owned by the node. Potential via nodes may accept or decline to become part of a PVC based on the capacity of trunks local to the potential via node and on the resource requirements of the PVC. While a potential via node is being queried by one master node, it is unavailable for querying by another master node. Furthermore, when a via node accepts a master node request, it must reconfigure its equipment to become part of that PVC; it is unavailable to respond to other PVC requests during this time. When a node is unable to respond to the PVC request of a second master node because it is responding to the PVC request of a first master node, a collision occurs; the second master node must back-off and attempt the reroute of the entire PVC at a later time. A collision may also occur if a first master node queries a second master node which is busy making a via request of a potential via node. In general, a collision occurs when two objects or devices in a system attempt to access the same resource at the same time, when the resource can service only one object or device.

A collision and the subsequent reroute reattempt waste the resources of both the master node and the nodes already existing in the PVC being constructed, and lengthen the recovery time of the master node and thus that of the entire network. Since a via node is typically part of multiple PVCs, one master node's recovery may thus interfere with the recovery of other master nodes. This creates problems when major network outages occur and large numbers of nodes are attempting to recover simultaneously. A master node making a reroute attempt and experiencing a collision after rerouting a portion of a PVC has, during its reroute attempt, created interference with other master nodes which is unnecessary, as that master node has not achieved an actual reroute.

During normal operations and during recovery, each node in such a network performs a certain amount of background processing. Each node has a certain amount of processor capacity, used for background processing and rerouting activities. Rerouting activities load a node's processor, increasing processor occupancy (a measure of the fraction of time a processor is working as opposed to idle). Rerouting PVCs requires a certain amount of processing in addition to background processing on the part of a master node (generally resulting from contacting via nodes). If the combination of the amounts of background processing and rerouting processing increase enough, the amount of rerouting able to be done may be limited. A request to a via node to participate in a PVC consumes a portion of the processing resources for that node. In addition, a request also prevents another request from taking place to that via node. Thus a collision increases the processing load of both master and via nodes and increases the time for overall network recovery.

Timing limitations on nodes in a network may be created to minimize interference among the nodes during recovery. A node may be given a set time to wait before re-querying a via node or between PVC creation reattempts; this time may be increased in the event of a collision. Increasing the interval between master node queries of via nodes or PVC creation reattempts decreases interference, which increases the efficiency of the recovery; however, increasing this interval increases the recovery time of each node and thus of the whole network. These factors must be balanced if an interval is to be effective in improving overall recovery time. Current methods of creating timing limitations, relying on a dynamic increase in a timing delay in response to collisions, do not optimally reflect the relationship between network interference and reroute attempts, and do not balance the need to avoid interference and the need to recover quickly.

In current networks, nodes may be manually divided into sets which recover at different times. The sets are created according to an operator's guess as to the interference between nodes; such a guess may be based on, for example, the geographic location of the nodes. Such a method provides at best an approximation of the true interference between nodes in a network, which may be based on a complex network and PVC architecture. A method of dividing the nodes in a network into sets based on accurate information as to the interference between recovering nodes does not exist.

Two or more nodes recovering at the same time interfere minimally with each other when, according to some measure, each nodes' queries to via nodes results in a minimum number of collisions with other nodes' queries to via nodes. Objects or devices, including nodes, may interfere with each other's operation when they compete for the same resource; such interference may occur, for example, when two nodes in a network make a via request to the same node during the same time period. Two or more objects competing for resources at the same time interfere minimally with each other when each object's use of the resources results in a minimum number of collisions with the other object's use of the resources. Entities such as objects or devices may be, for example, applications or modules in a computing device, physical nodes competing for access to other nodes, or any other entities which perform activities which may interfere with or compete with each other. Activities entities perform may be, for example, accessing limited operating system resources, communicating with nodes, or any other activity.

In view of the foregoing, there is a need for organizing the activities of items such as devices, objects, or nodes competing for the same resources such that the interference between items is minimized. There is a need for a method to determine the amount of interference between devices, objects, or nodes competing for the same resources (e.g., master nodes in a network competing for via nodes). There is a need for organizing devices, objects, or nodes competing for the same resources into sets such that the interference between items within sets is minimized; if such sets access resources in overlapping time periods there is a need to provide an optimum sequence for such activity so that interference among sets is minimized. There is a need to provide a timing limitation on objects such as nodes competing for resources which accurately reflects the relationship between accessing resources and interference among access attempts.

It would be desirable to provide a system and method for allowing a set of nodes in a network to reestablish connections in the network in the quickest manner possible. There is a need for a system and method for organizing the recovery of network equipment to minimize interference between the network components and thus maximize recovery efficiency and speed. There is a need to provide a measure of inter-node recovery interference and to separate nodes into sets, or into a sequence of sets, where this interference is minimized. There is a need to provide an accurate timing limitation on recovering nodes in a network to minimize interference.

SUMMARY OF THE INVENTION

An embodiment of the system and method of the present invention organizes the recovery of a communications network to minimize the interference between the recovering nodes and thus allows for a faster recovery. Alternate embodiments may organize any system of objects or devices competing for resources to minimize interference between the resources.

An embodiment of the system and method of the present invention calculates a metered rate at which nodes recover from a major network failure, based on the architecture of the network and the characteristics of the nodes in the network, and of the virtual circuits forming the network. An optimum metered rate is calculated, at which the network recovers quickly but without performance degrading interference. An embodiment creates a measure of the interference between recovering nodes; the measure of interference may be used to partition the set of recovering nodes into subsets, where the recovery process of each node within a subset interferes minimally with the recovery processes of other nodes within that subset. The subsets recover at different times, reducing overall recovery interference and speeding recovery. Recovering items (nodes or sets of nodes) may be sequenced so that each item recovers substantially separately in time, but where adjacent sequence items recover with some temporal overlap. The amount of interference occurring between adjacent items in the sequence is minimized.

Embodiments of the system and method of the present invention may organize the activities of any system of items such as objects or devices such that interference among items is minimized. An optimum rate for activities undertaken by items may be created to minimize overall interference. A measure of interference between items competing for resources may be created; this measure may be used to partition and sequence the items.

DETAILED DESCRIPTION OF THE INVENTION

I. Overview

Figure 1:
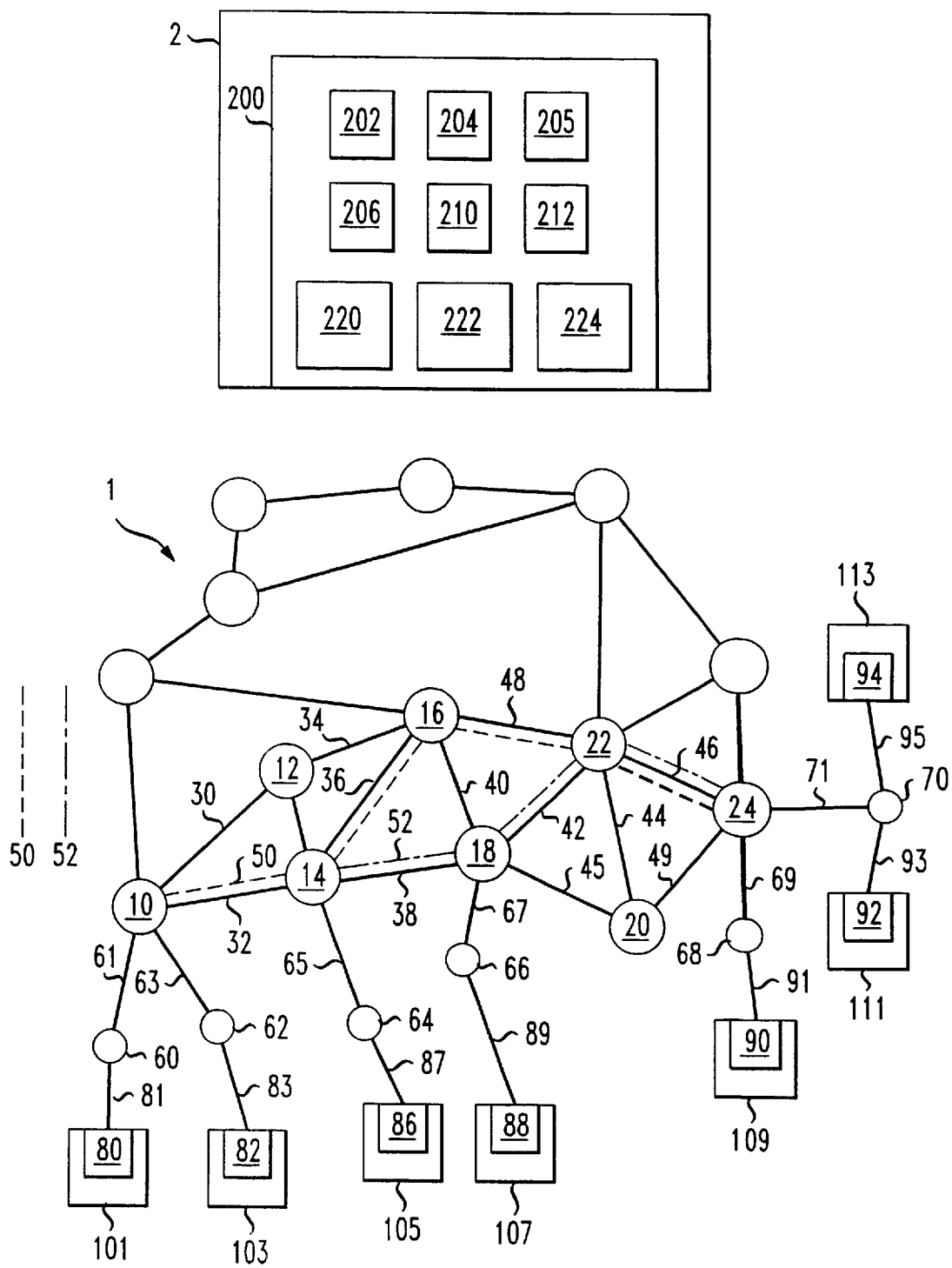
FIG. 1 is a block diagram depicting a network according to an embodiment of the present invention.

An embodiment of the system and method of the present invention organizes the recovery of a communications network to minimize the interference between the recovering nodes and thus allows for a faster recovery. Alternate embodiments may organize any system of objects or devices competing for resources to minimize interference between the resources.

An embodiment of the system and method of the present invention calculates a rate at which nodes recover from a major network failure, based on the architecture of the network and of the characteristics of the nodes in the network, and of the virtual circuits forming the network. Higher recovery rates result in a slower overall network recovery, as more interference is generated between recovering nodes. Lower rates may also result in slower recovery, as the nodes of the network reform virtual circuits at a lower rate. Existing systems create rates based on the local characteristics of individual nodes without taking into account overall network characteristics, and do not accurately balance the need to avoid interference with the need to recover quickly. An embodiment of the system and method of the present invention calculates an optimum rate, at which the network recovers quickly but without performance degrading interference. Another embodiment calculates an optimum rate for objects or devices competing for resources to access those resources, reducing interference which reduces overall system performance.

An embodiment of the system and method of the present invention creates a measure of the interference between recovering nodes. An embodiment may use the measure of interference to partition the set of recovering nodes into subsets, where the recovery process of each node within a subset interferes minimally with the recovery processes of other nodes within that subset. The subsets recover at different times, where each node within a subset recovers at the same time. Allowing the nodes of different sets to perform recovery operations at different times, where the nodes within each set are those determined to interfere minimally with each other, reduces the overall interference occurring during the recovery of the network and allows for a speedier recovery. Existing systems do not separate nodes into sets based on an actual measure of interference between objects, or based on the overall structure of the network.

Another embodiment may determine a measure of interference between objects or devices competing for resources, and may further use this interference to partition the objects or devices into sets, where the items within each set access resources at the same time.

Another embodiment of the present invention allows for the recovery of nodes or subsets of nodes to occur at different times but with some temporal overlap. Such an embodiment uses a calculation of the amount of recovery interference occurring between nodes or subsets of nodes to create an optimal recovery sequence or ordering. In the optimal recovery sequence, nodes or subsets of nodes adjacent to each other in the sequence overlap somewhat in their recovery periods, and thus the system and method insure that the adjacent nodes or subsets interfere minimally with each other. A further embodiment sequences items or sets of items (such as nodes, objects or devices competing for resources) to minimize interference between adjacent items in the sequence.

II. Structure

FIG. 1 is a block diagram depicting a network according to an embodiment of the present invention. Network 1 comprises a plurality of nodes, e.g., nodes 10, 12, 14, 16, 18, 20, 22 and 24, directing traffic into, out of, and through network 1; a plurality of links, e.g., links 30, 32, 34, 36, 38, 40, 42, 44, 45, 46, 48 and 49, connecting nodes and transmitting data and control signals between nodes; a plurality of user sites 101, 103, 105, 107, 109, 111 and 113, requiring the transmission of data; a plurality of edge vehicle switches 60, 62, 64, 66, 68, and 70, located with nodes, interfacing with user sites 101–113, concentrating data entering network 1, demultiplexing data leaving network 1, and transforming data between frame format and ATM format; a plurality of routers 80, 82, 86, 88, 90, 92, and 94, transmitting data between user sites 101–113 and edge vehicle switches; site connections 81, 83, 87, 89, 91, 93, and 95, connecting, and transmitting data between, routers and edge vehicle switches; and edge vehicle connections 61, 63, 65, 67, 69, and 71, connecting, and transmitting data between, edge vehicle switches and nodes. Network 1 includes NOC 2, monitoring network 1, coordinating node recovery activity, and transmitting control signals to nodes.

For the sake of clarity not all equipment such as nodes, links, routers, user sites, etc., of network 1 is depicted in FIG. 1, and not all depicted nodes and links are labeled. Network 1 comprises on the order of 200 nodes. Network 1 comprises numerous PVCs for transmitting data between user sites 101–113; for clarity only PVC 50 and PVC 52 are depicted. Each node in network 1 may master, for example, 1,000 to 5,000 PVCs and participate in 2,000 to 12,000 PVCs as a via node. A link may participate in 5,000 to 9,000 PVCs. Alternate embodiments of the present invention may function with networks not including PVCs. Embodiments of the system and method of the present invention may function with networks having different structures and different numbers of components and may function with systems other than networks, such as a system of software modules competing for access to operating system resources.

In an exemplary embodiment of the present invention nodes are BPX™ switches and edge vehicle switches are AXIS™ or IPX™ units, and are located at the same sites as nodes. Each router is located at a user site 101–113. Links (including edge vehicle connections and site connections) are typically either coaxial cable or fiber-optic cable, but can be any transmission medium capable of transporting traffic. Individual links can vary in length from a few feet to hundreds of miles. Various sized links have different data transmission rate limits. In an exemplary embodiment, edge vehicle connections and site connections are DS3 links, while links are DS3 or OC3 links.

In an exemplary embodiment NOC 2 comprises network recovery tool 200, controlling the recovery activities for nodes. Network recovery tool 200 comprises back-off computation module 202, calculating a rate at which nodes should attempt rerouting; interference computation module 204, determining the interference among nodes in network 1 and creating an overall interference matrix 220; extract/partition module 205, extracting from overall interference matrix 220 a recovery matrix 222 and partitioning the recovering nodes into subsets; alarm processor module 206, accepting alarm or failure signals from network components and creating a set of nodes for which recovery is required; sequence module 210, creating sequence matrix 224 and sequencing nodes or sets of nodes attempting recovery; and script generator module 212, generating commands to direct nodes based on a recovery rate, sequence or partition. Matrices 220 and 222 indicate recovery interference among nodes in network 1 and sequence matrix 224 indicates recovery interference among recovering items (nodes or sets) which are to be sequenced.

Each module may be implemented using known programming and hardware methods. In an exemplary embodiment of the present invention, each component module is implemented using a Sun™ SPARC™ workstation running code generated from C source code and using the AMPL and CPLEX™ packages. Other languages, packages and hardware configurations may be used. Modules requiring communication with nodes (for example, involving information describing PVCs or commands to nodes) may use equipment at NOC 2, such as a satellite connection (not shown), a land link separate from links carrying traffic (not shown), or links carrying traffic. In alternate embodiments, the functions performed by the specific modules described may be performed by other structures or modules, or combinations of structures or modules. For example, alarms may be processed without the requirement of alarm processor module 206. Not all functions described need to be performed for all network outages; alternate embodiments need not include certain functionality. For example, a reroute attempt rate need not be created.

In an exemplary embodiment network recovery tool 200 is located at NOC 2, but network recovery tool 200 may be in any location, and may have different aspects of its functionality located in different places. Alternate embodiments do not require NOC 2.

In an exemplary embodiment of the system and method of the present invention, only nodes which must perform recovery or rerouting have their recovery directed by modules 202, 204, 205, 206, 210 and 212 and NOC 2, although the set of nodes requiring recovery may be all nodes in network 1. Alarm processor module 206 accepts alarms and error messages from nodes in network 1 and determines which nodes need to recover; these nodes have their recovery directed. The nodes determined as requiring recovery may be those which master a PVC which has been made inoperative by the failure of an item of network equipment. In an alternate embodiment, an operator may determine the set of nodes requiring recovery.

In an exemplary embodiment, on the failure of a portion of network 1 nodes must determine the existence of and state of other nodes in the network. This is achieved by nodes exchanging messages on control channels. Typically control channels are virtual circuits created from sequences of nodes and links which also transmit user data. A network failure may interrupt control channels. All a node's control channels must be reestablished before that node may reroute PVCs, as communications between a master node and potential via nodes are sent via control channels. During normal network operations, continuous polling or broadcast information on the state of nodes is sent via control channels indicating the status of the nodes of network 1.

PVC 50 transmits data between user site 101 and user site 113, and at a given time may comprise nodes 10, 14, 16, 22 and 24 and links 32, 36, 48 and 46; node 10 is the master node owning PVC 50 and nodes 14, 16, 22 and 24 are via nodes for PVC 50. PVC 52 transmits data between user site 105 and user site 113, and at a given time may comprise nodes 14, 18, 22 and 24 and links 38, 42 and 46; node 14 is the master node owning PVC 52 and nodes 18, 22 and 24 are via nodes for PVC 52. Multiple PVCs may terminate at any given user site. A PVC may transmit data in two directions.

In an exemplary embodiment of the present invention, data enters network 1 via a router in frame relay form, having data packets of variable length. The data packets are transmitted to edge vehicle switches which convert the data to ATM form (having set length packets) and transmit the data to a master node owning a PVC providing a transmission route for the user site. The master node transmits the fixed length packets via the PVC to the via node at the other end of the PVC, which transmits the data to an edge vehicle switch. The edge vehicle switch converts the ATM data into frame relay format and transmits the data to the router at the user site. In such a manner frame relay data is transmitted from one user site to another user site.

While, in an exemplary embodiment, data is transmitted to network 1 in frame relay form and is transmitted through network 1 in ATM form, alternate implementations are also contemplated for use in conjunction with networks accepting and transmitting data in different formats. Such deviations do not affect the overall operation or benefits of the network of the present invention. For example, the present invention may be used with a network accepting and transmitting in ATM format.

For example, to transmit data from user site 105 to user site 113 via PVC 52, user site 105 transmits a frame relay packet to router 86. Router 86 transmits the data packet to edge vehicle switch 64, which converts the data to packetized form and transmits the data to node 14, which is the master node owning PVC 52. Node 14 transmits the packets via PVC 52 to node 24 via nodes 18, 22 and 24 and links 38, 42 and 46. Node 24 transmits the data to edge vehicle switch 70, which converts the packetized data into frame relay format and transmits the data to router 94 at user site 113.

Nodes master PVCs they own: they create the PVCs by requesting the participation of via nodes, maintain knowledge of the state of PVCs, and reconfigure PVCs if required. The path each PVC takes is comprised of nodes and links and may vary depending on the state of the network. A PVC may have to be reconfigured if a piece of network equipment fails. For example, if node 16 fails, due to, for example, a power outage, master node 10 must reconfigure PVC 50. Master node 10 queries other nodes in network 1 to determine if they can participate in a PVC for connecting user sites 101 and 113. The majority of the requested nodes respond affirmatively and become via nodes for PVC 50. For example, PVC 50 may be reconfigured as having a path comprising nodes 10, 14, 18, 20, 22 and 24 and links 32, 38, 45, 44 and 46. PVC 50 still transmits data between user site 101 and user site 113; however, its path has changed.

Different master nodes rerouting PVCs may attempt to use the same resource at the same time by querying one via node for participation in the PVCs each master node owns. A via node may respond to only one PVC request at once. For example, at a certain time node 10 masters PVC 50 which includes, among other nodes, node 22, and node 14 masters PVC 52 which includes, among other nodes, node 22. If node 22 fails, master node 10 must reconfigure PVC 50 and master node 14 must reconfigure PVC 52. As part of this reconfiguring, each node queries various nodes, including, for example, node 20, for participation as a via node in PVCs 50 and 52. Node 20 can only respond to one via request at once; generally this takes less than one second. If node 20 is responding to a query from node 10 and, at the same time, node 14 transmits a via request to node 20, a collision occurs. The reconfiguration of PVC 50 by node 10 is delayed; since the transmission of the via request consumes processing capacity of node 10 this processing capacity is wasted and the processing load on node 10 increases. After such a failure, node 10 repeats the attempt to configure all of PVC 50, rather than reattempting to contact the busy potential via node.

A node may be a master of several PVCs sharing the same physical path; such a group of PVCs may be called a bundle or a logical connection. When reconfiguring the PVCs comprising a logical connection, a master node may reconfigure all PVCs in the logical connection simultaneously. Therefore, when used herein, PVC, logical connection and bundle may be used interchangeably.

Figure 2:
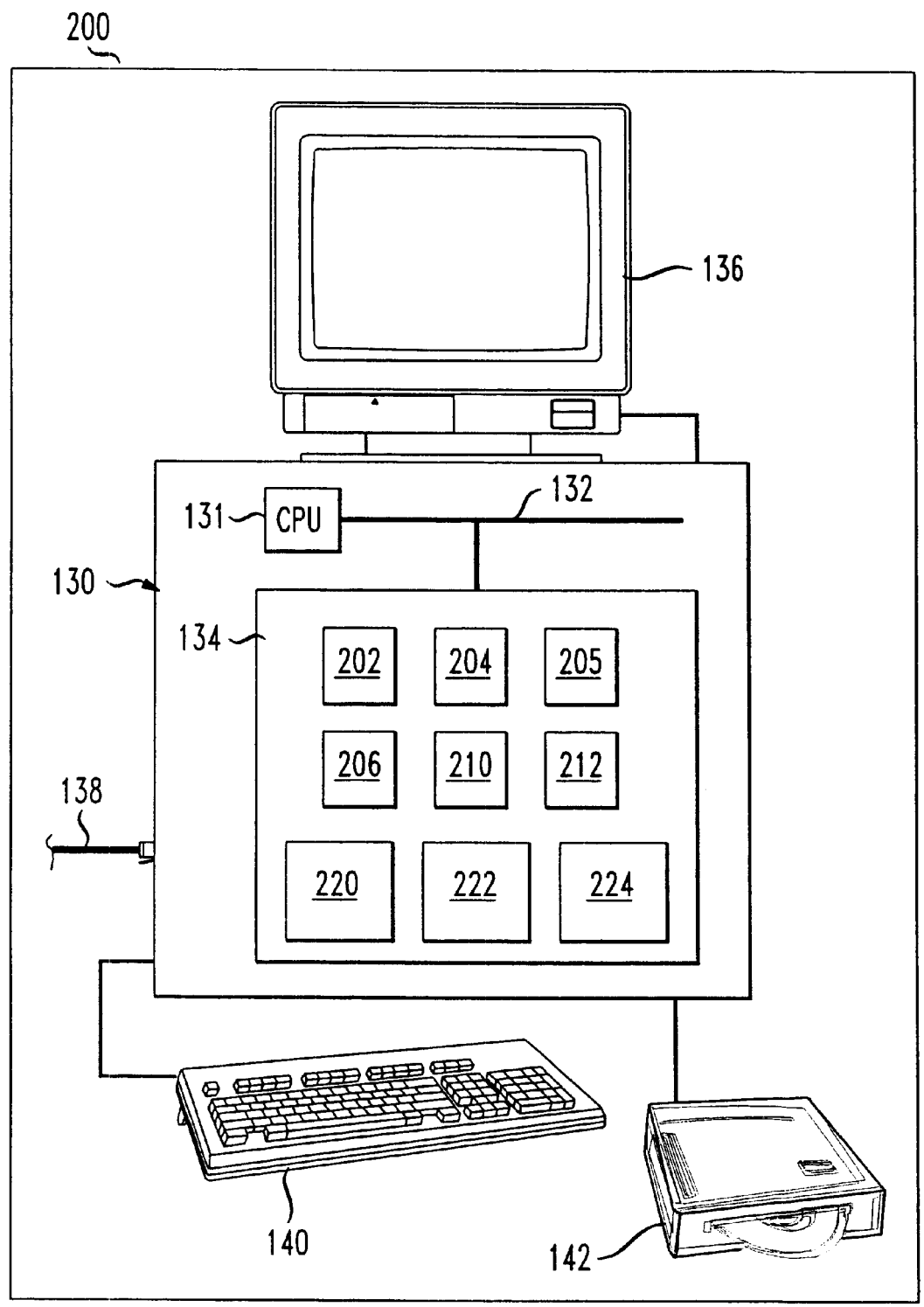
FIG. 2 is a block diagram illustrating the NOC of FIG. 1 according to an embodiment of the present invention.

FIG. 2 is a block diagram illustrating NOC 2 of FIG. 1 according to an embodiment of the present invention. NOC 2 includes computer system 130, implementing a portion of the functionality of NOC 2. Computer system 130 includes a central processing unit ("CPU") 131 connected to a system bus 132. CPU 131 executes instructions and controls the operation of computer system 130. CPU 131 may comprise multiple units. System bus 132 allows the various components of computer system 130 to communicate, and may alternatively include a plurality of busses or a combination of busses and bus bridge circuits. In an exemplary embodiment computer system 130 is a Sun™ SPARC™ workstation.

Computer system 130 further includes random access memory ("RAM") 134, connected to system bus 132 and providing non-permanent storage of back-off computation module 202, interference computation module 204, extract/partition module 205, alarm processor module 206, sequence module 210, script generator module 212, overall interference matrix 220, recovery matrix 222, sequence matrix 224, and other data and program instructions (not shown). Computer system 130 includes a monitor 136, displaying information to a user; a network communications connection 138, allowing computer system 130 to interface with other computer systems and with devices (such as a satellite connection) allowing communication with equipment, such as nodes, of network 1 (FIG. 1); a keyboard 140, allowing a user to input text; and a disk drive 142, providing storage for modules 202, 204, 205, 206, and 210, matrices 220, 222, and 224, and files and other information. Network communications connection 138 may comprise a plurality of devices and connections.

A portion of modules 202, 204, 205, 206, and 210, and matrices 220, 222, and 224, may be stored in RAM 134, on disk drive 142, or in other devices. Back-off computation module 202, interference computation module 204, extract/partition module 205, alarm processor module 206, sequence module 210, and script generator module 212 are executed by CPU 131, and to an extent control the operation of computer system 130 in cooperation with other components such as CPU 131. Modules 202, 204, 205, 206, and 210 may be implemented by, for example, a series of instructions (including code generated from C source code using the AMPL and CPLEX™ packages) stored on disk drive 142 or RAM 134. However, the system and method of the present invention may be implemented by other methods, using languages and hardware configurations, without affecting the overall operation or benefits of the network of the present invention.

III. Back-Off Computation Module

In an exemplary embodiment of the present invention, back-off computation module 202 determines an optimal metered attempt rate at which each node initiates reroute attempts of PVCs. The rate is the number of bundles of PVCs for which each node in network 1 initiates rerouting per second. The rate determines the initiation of both successful and unsuccessful reroutes; only a portion of the number of reroutes attempted are successfully completed. For example, if back-off computation module 202 outputs a rate of 0.0317 bundles/second, a master node experiencing a collision waits 31.54 seconds (the delay value corresponding to the rate) from the previous attempt initiation to reattempt the reroute.

The optimal metered attempt rate maximizes the good-put rate (the rate at which PVCs are successfully rerouted) by balancing the need to recover quickly with the need to avoid the delay and waste of processing time resulting from collisions. High reroute attempt rates cause collisions and waste resources, but throttling this activity by too large an amount also prolongs the overall reroute process.

In creating the optimal rate, back-off computation module 202 assumes that all nodes in network 1 are simultaneously rerouting bundles of PVCs which they master. Back-off computation module 202 assumes a "worst case scenario" where the majority of nodes are rerouting; in an alternate embodiment, the parameters and assumptions used by back-off computation module 202 may be altered based on the number of nodes recovering and the severity of the failure.

To create a metered attempt rate R applicable to all nodes in network 1, back-off computation module 202 assumes a symmetrical case where all nodes in network 1 are identical. Back-off computation module 202 uses a formula producing good-put rate λ (bundles/sec/node) based on certain inputs including processor occupancy ρ and other assumed inputs. Back-off computation module 202 adjusts occupancy ρ while holding other inputs constant to maximize good-put rate λ, then creates metered attempt rate R as a function of ρ and λ.

Back-off computation module 202 maximizes good-put rate λ according to the following:

$$\lambda = \rho/(([\rho/(1.0-\rho)]*h+[\rho/(1.0-\rho)]*h(h+1)/2)*c+\beta)$$

where

ρ=processor occupancy per node;

β=processor utilization at each node due to background work;

h=average number of hops for each bundle; and c=processor resource consumption per reroute attempt.

β, h, and c are assumed from the topology and performance capabilities of network 1, and are held constant as ρ is adjusted to maximize λ. In an alternate embodiment, other parameters may be used. Solving an equation with a number of constants and variables so that one variable is optimized (maximized or minimized) is well known.

In an exemplary embodiment processor occupancy ρ is an average of the percentage (expressed as a number between 0 and 1) of time the processor at each node in network 1 is working as opposed to idle. Processor occupancy at a first node is an indication of the probability that a second node making a reroute request to the first node will experience a collision; thus ρ is an expression of the likelihood any node making a via request experiences a collision.

Processor utilization β is a number between 0 and 1 (e.g.,0.3) indicating the assumed average of the percentage of the time the processor at each node in network 1 performs background work, which includes tasks such as communications with other processors to determine the state of network 1, and provisioning to add or remove PVCs based on customer requests. Processor resource consumption per reroute attempt c is an assumed average amount of time, in seconds (e.g., 0.7 seconds), that a master or via node's processing is occupied during a request to a via node to participate in a PVC.

For each bundle requiring rerouting, the average number of reroute requests needed for each component node (several successive collisions followed by success) assuming a negative binomial distribution is ρ/(1.0-ρ). The number of reattempts per bundle made by a master node for each bundle it owns is [ρ/(1.0-ρ)]*h.

It is assumed that each node masters M bundles of PVCs and each bundle constitutes, on average, h hops. Each node also participates as a via node in V bundles which are mastered by other nodes, where V=M*h. For each node acting as a via node, [ρ/(1.0-ρ)]*h*(h+1)/2 reattempts are made by other master nodes to that node. Thus, for each node, the number of attempts the node must process (due to requests made from and made to the node) is ([ρ/(1.0-ρ)]*h+[ρ/(1.0-ρ)]*h*(h+1)/2).

After good-put rate λ is maximized, back-off computation module 202 creates metered attempt rate R from the formula:

$$R=\lambda*[\rho/(1.0-\rho)]*h$$

Good-put rate λ is multiplied by the number of times an attempt is made to reroute each bundle to produce an actual metered attempt rate, which is the attempt rate required to achieve good-put rate λ. By providing a reattempt rate based on an assessment of network 1 as a whole, and an assessment of the effect a node's activity has on other nodes, the system and method of the present invention provides for a more accurate reattempt rate.

In an exemplary embodiment of the present invention, back-off computation module 202 is run periodically, either at a user initiation or according to a timer; in alternate embodiments back-off computation module 202 may be run at other times, for example in the event of a failure. Metered attempt rate R is stored at computer system 130 for later use in a network failure. In the event of a failure, metered attempt rate R is made part of a script transmitted to the nodes of network 1 during recovery. In an alternate embodiment, metered attempt rate R may be transmitted to the nodes in a manner other than via a script, or may be integrated into the recovery process in other manners; for example, the attempt rate may be sent to nodes directly, or may be calculated at nodes.

Other embodiments of the system and method of the present invention may be used to create an optimal rate for the activities of any sort of objects or devices competing for access to resources, where an object or device accessing a resource affects the likelihood that another object or device is able to access a resource, or affects the efficiency of the system of objects. The objects or devices may be, for example, applications or modules in a computing device. Other embodiments may use other measures of a rate and methods of calculating the rate; for example, the rate may be expressed as a delay between reroute attempts, a delay to be used only after collisions, or as a throttle on node, object or device processing activity.

IV. Determining The Interference Between Nodes

An exemplary embodiment of the system and method of the present invention allows for a measure to be created of the amount two nodes simultaneously recovering interfere with each other's recovery. Another embodiment of the system and method of the present invention creates a measure of interference for a set of objects or devices competing for the same set of resources. Using a measure of interference, activities of objects or devices (i.e., recovering nodes) may be completely or partially separated in time in a manner minimizing interference and speeding system operation.

Recovering nodes in network 1 may interfere with the recovery of other nodes, lowering the overall rate at which nodes may recover. Having nodes recover individually eliminates this problem but, with large numbers of nodes, extends the recovery process. With a determination of internodal interference, the nodes of network 1 may be partitioned into subsets, and recovery of sets of nodes may be completely or partially separated in time in a way allowing the quickest overall network recovery. All the nodes in any subset recover at the same time, while the nodes of different subsets recover at different times or at substantially different times. In such a manner, the nodes recovering at any given time minimally interfere with one another. A measure of interference may be used to create a sequence of recovering nodes or sets of nodes whose recovery operations overlap.

In an exemplary embodiment, the system and method of the present invention create a determination of the amount of interference between any two recovering nodes in a network. Periodically, for example once a month, a matrix is created indicating the recovery interference for all pairs of nodes in the network; the matrix is stored for later use. In the event of a failure, this matrix may be used to allow the failed nodes to recover.

In an exemplary embodiment of the present invention the measure of interference during recovery between two nodes i and j is the sum, over all potential via nodes in network 1, of the product of the number of logical connections mastered by node i which include a given node and the number of logical connections mastered by node j which include that same given node. Multiple PVCs having the same path, forming a logical connection, are reconfigured simultaneously, and are thus considered as one unit during the interference calculation; alternate embodiments may consider individual PVCs in the interference calculation. Such a determination may be given as:

$$D(i, j) = \sum_{k=1}^{n} M(i, k) * M(j, k)$$

where D is the measure of interference between nodes i and j, n is the number of nodes in network 1, and M(x, y) is the number of logical connections mastered by node x which include node y as a via node. Generally, two nodes recovering from a failure by rerouting PVCs which they master only interfere with each other's recovery process to the extent that they make requests of the same nodes to become via nodes for PVCs or to the extent one of the nodes makes via requests to the other.

In an alternate embodiment, the measure of interference during recovery between two nodes i and j is the sum, over all potential via nodes in network 1, of the sum of the number logical connections mastered by node i which include a given node and the number of logical connections mastered by node j which include that same given node. Such a determination may be given as:

$$D(i, j) = \sum_{k=1}^{n} [M(i, k) + M(j, k)]$$

where D is the measure of interference between nodes i and j, n is the number of nodes in network 1, and M(x, y) is the number of logical connections mastered by node x which include node y as a via node.

Other embodiments of the interference measure of the present invention may be used to calculate the interference between any set of objects or devices (including applications or modules in a computing device or nodes in a network) seeking to use a set of resources. Other embodiments may use other measures of interference and methods of calculating interference. For example, instead of basing the determination on the number times device x uses resource y, the method may use the probability that device x will require resource y or the probability that two devices will interfere with each other. In another embodiment, the method may sum over a different determination that a collision occurs between two competing objects or devices.

In an exemplary embodiment of the present invention, interference computation module 204 is run periodically, for example once a month, to determine the interference among all nodes in network 1. Interference computation module 204 accepts as inputs information describing all PVCs in network 1 (e.g., the master node and via nodes for each PVC). From this information, interference computation module 204 may calculate the amount of recovery interference which may occur between all pairs of nodes in network 1 in the event of a major failure. Interference computation module 204 may query each node in network 1 for this information or may have this information input by human operation. Interference computation module 204 creates overall interference matrix 220, which indicates the recovery interference between all pairs of nodes in network 1 and stored in computer system 130. Each node in network 1 appears on both the x and y axes; each entry in overall interference matrix 220 indicates the measure of interference between the two nodes corresponding to the row and column.

V. Partitioning The Network

An exemplary embodiment of the present invention partitions the nodes of the network which require recovery into subsets ("recovery sets" or "partition sets"), where the amount of recovery interference occurring among the nodes in each recovery set is minimized. The nodes within each set are allowed to recover during the same time period. The nodes of different recovery sets recover at different times or at substantially different times. An alternate embodiment partitions objects or devices performing an activity into subsets which interfere minimally with each other. The items within each set perform their activity at the same time and the items in different sets perform their activity at different times.

In an exemplary embodiment of the present invention, extract/partition module 205 first combines pairs of nodes into sets, then iteratively combines pairs of sets into larger sets. Each combination uses a process to minimize the interference among the items within each set. This process is repeated a certain number of times until an ideal partition, or grouping of sets, is created. In alternate embodiments, methods of partitioning other than iteratively combining pairs of nodes or sets may be used.

In an exemplary embodiment, in order to partition the recovering nodes into recovery sets (to determine the contents of the recovery sets), extract/partition module 205 creates recovery matrix 222, where each node requiring recovery is represented on both the x and y axis. The set of nodes requiring recovery may be all nodes in network 1. If the set of nodes requiring recovery is smaller than the set of nodes in network 1 (because certain nodes do not require recovery), recovery matrix 222 is smaller than overall interference matrix 220. Each entry in recovery matrix 222 contains a measure of the recovery interference between two nodes. Recovery matrix 222 may be constructed from an interference matrix calculated beforehand, such as overall interference matrix 220 created by interference computation module 204. Extract/partition module 205 augments recovery matrix 222: dummy nodes are added so that the total number of nodes in the matrix is a power of two, and values are added for interference between dummy nodes and other nodes and between any node and itself.

In an exemplary embodiment of the present invention, the measure of interference between a node and itself is set to 1,000,000, a number much higher than the expected interference between any two nodes in network 1. The measure of interference between a dummy node and any non-dummy, i.e., real, node is set 1, lower than expected values. In an exemplary embodiment the augmentation of the matrix may be expressed as follows:

D(i, i)=1,000,000, 1<=i<=n;

D(i, j)=1, n'<j<=n, 1<=i<=j; and

D(i, j)=1, n'<i<=n, 1<=j<=i;

where D is the measure of interference between node i and node j, n' is the number of nodes in network 1, and n is the next power of two higher than n'. In other embodiments other values may be used to fill these positions.

To create the partition, extract/partition module 205 first partitions the nodes into sets, each containing two nodes, using recovery matrix 222, where the nodes in each set interfere minimally with each other's recovery. Prior to being placed into sets, each node may be considered to exist in a set of its own; the process may be considered to initially place each node into a set of its own. To partition the nodes into pairs, extract/partition module 205 iteratively performs a min/max process on recovery matrix 222. Extract/partition module 205 first evaluates all pairs in recovery matrix 222, and finds the pairing of two nodes where, after the two nodes are paired, the maximum interference of all possible pairings in the matrix is minimized. This pair is removed from further consideration (both of the two entries for this pair in the matrix are no longer considered), placed in a set, and the min/max process is run on the remaining nodes of the matrix. Extract/partition module 205 continues this process until each node paired with another node in a set. Such min/max methods are known.

Expressed differently, to partition the nodes into N/2 subsets of 2 nodes each, a binary variable $X(i, j)$ is defined such that $X(i, j)=\{0, 1\}$, $X(i, j)=1$ if i is paired with j and 0 otherwise, and the following is solved so as to minimize, for all pairings, the maximum $X(i, j)*D(i, j)$ resulting from the pairing, subject to:

$\Sigma X(i, j)=1$, $1<=i<=N$ and $\Sigma X(i, j)=1$, $1<=j<=N$

After finding the first pair in this manner, this step is performed iteratively over the yet unpaired nodes, and a lexicographic solution is obtained; N/2 subsets of pairs of nodes are created.

In an alternate embodiment of the present invention, any pairing method may be used to minimize the total interference over the pairings in recovery matrix 222. For example, a function using a sum of squares of interferences or sum of interferences may be used. Other embodiments need not make use of dummy nodes.

To combine sets of nodes to create a partition of a smaller number of sets of nodes, extract/partition module 205 iteratively combines sets which interfere minimally with each other; each iteration pairs two sets into one larger set. To perform this function, extract/partition module 205 determines the amount of recovery interference occurring between each pair of sets. A first set interferes minimally with a second set if the nodes in the first set interfere minimally with the nodes in the second set.

To combine a group of sets into larger sets, extract/partition module 205 creates a matrix containing values indicating measures of the interference among the sets to be combined. Extract/partition module 205 calculates the interference between the sets containing pairs of nodes, and creates a matrix (similar to that of a set of individual nodes) with each set appearing on both the x and y axes and interference measures as entries. To determine the interference between two sets of nodes, the sum of the interferences between all pairs of nodes which may be created by selecting one node from the first set and another node from the second set is calculated using recovery matrix 222. In an exemplary embodiment of the present invention, interference among nodes within each set does not enter this calculation; in alternate embodiments this interference may be used to calculate inter-set interference.

To combine pairs of sets, extract/partition module 205 performs a min/max evaluation on the sets of nodes, as described above: a pair of sets is selected so that the maximum interference over all possible pairings of sets is minimized. The pair is combined into a set and removed from further consideration. This process is repeated until all sets are paired. Other embodiments may use the interference measure of the present invention in other manners to partition the nodes into sets.

Extract/partition module 205 may repeat the pairing of the sets into larger sets any number of times, until a desired number of sets and size of sets is achieved. Because dummy nodes may be combined with actual nodes in recovery matrix 222, and because the dummy nodes may be discarded after the initial partitioning of individual nodes into pairs of nodes, the resulting partition may result in sets of uneven size.

The number of times the sets are combined is dependent on network 1 and the number of nodes, as it is not desirable to combine the sets to the point that only one set exists. Generally, as the disruption in network 1 increases in severity, more sets for recovery should be created. In an exemplary embodiment, the determination as to the number of times to combine the sets is made by a human operator. In alternate embodiments the determination may be made by a machine implemented component, for example extract/partition module 205.

In one embodiment, the nodes in each recovery set created by this process may recover at separate times. In such a recovery, all nodes within each recovery set recover at the same time or in the same window of time. There is no temporal overlap between the recovery of the different recovery sets; no node in a given recovery set recovers at the same time as a node in a different recovery set. Such a recovery is more time efficient than both a recovery where each node recovers individually, without temporal overlap with any other node, and a recovery where all nodes recover simultaneously. A recovery of nodes in groups of recovery sets strikes a balance between inefficiency caused by recovery interference and inefficiency caused by the non-use of network resources.

While an embodiment of the system and method of the present invention describes a system and method for partitioning nodes, other embodiments of the present invention may partition devices or objects into sets, whereby the devices or objects in each set minimally interfere with one another. An embodiment of the system and method of the present invention determines interference occurring between sets of items (such as objects, devices, or nodes). A first set of items interferes minimally with those of a second set if the items in the first set interfere minimally with the items in the second set.

VI. Recovery In A Sequence Of Sets

In an embodiment of the present invention where items (such as nodes or sets of nodes) recover at separate times, some overlap between the recovery of items may be desired. In such a recovery, the recovery times of nodes or recovery sets are staggered but overlap partially to reduce the overall recovery time for network 1. For example, a first item starts its recovery process. At some later point in the item's recovery process, a second item starts its recovery process; at a later time, the first item completes its recovery and the second item continues recovering. The overlapping recovery processes interfere with one another to an extent, but the inefficiency caused by the interference is compensated for by having more nodes or sets of nodes recovering at the same time. If the recovery of nodes or recovery sets of nodes does not overlap (if a node or set starts rerouting once its predecessor finished), no such sequence is required.

An embodiment of the system and method of the present invention allows for a sequence of items (objects, devices, or nodes) or of sets of items to be created, where items adjacent to each other in the sequence interfere minimally with each other's recovery. A sequence is defined so that the sum of the interferences between adjacent items in the sequence is minimized. While in one embodiment, the items sequenced are nodes in a network or sets of nodes, other items, such as objects or devices, may be sequenced.

A sequence can be represented by a loop connecting vertices. A vertex represents an item (such as node in a network, an object or a device, or a set of nodes, objects or devices), and an edge between vertices represents the precedence relation in the sequence.

The sequence may be considered to be a loop, such that it does not matter where in the sequence recovery is started. However, to further enhance efficiency, the edge between adjacent vertices (i.e., items in the sequence such as nodes or recovery sets) in the sequence having the greatest interference may be used as a starting point in a traversal of the sequence; in such a manner the point of greatest interference in the sequence is eliminated. The sequence may be traversed in either direction. Multiple loops may exist in the sequence, to be executed in any order.

In an exemplary embodiment of the present invention, to create a sequence, sequence module 210 first defines sequence matrix 224. If the items to be sequenced are nodes, recovery matrix 222 may be used as sequence matrix 224. If the items are sets of nodes, the interference between the sets containing pairs of nodes is calculated, and sequence matrix 224 is created in a manner similar as the intermediate matrices created by extract/partition module 205 when combining sets into larger sets. Each set appears on both the x and y axes of sequence matrix 224 and interference measures between pairs of sets appear as entries. To determine the interference between two sets of nodes, the sum of the interferences between all pairs of nodes which may be created by selecting one node from the first set and another node from the second set is calculated.

In an exemplary embodiment, sequence module 210 creates a sequence of vertices (i.e., items such as nodes, objects, devices or sets) whereby the sum of the interferences between adjacent vertices in the sequence is minimized, subject to the limitations that each vertex may directly precede only one other vertex, and that sequences may exist comprising more than one loop of three or more vertices. If loops exist, they are traversed separately; loops may be traversed in any order. A traveling salesmen process may be used to minimize the sum of the interferences; methods of implementing traveling salesman processes are well known.

To create the sequence, sequence module 210 of an exemplary embodiment of the present invention uses a binary variable $X(i, j)=\{0, 1\}$, where $D(i, j)$ is the measure of interference between two vertices, i and j, being sequenced, and N is the number of vertices being sequenced, and solves:

Minimize $\sum_j X(i, j)^* D(i, j)$ where $X(i, j)=1$ if i and j are adjacent in the sequence and 0 otherwise, subject to the constraints of:

1. $\sum_j X(i, j)=1$, $1<=i<=N$
2. $\sum_i X(i, j)=1$, $1<=j<=N$; and
3. $X(i, j)+X(j, i)<=1$, for all pairs (i, j), i!=j Constraints 1 and 2 ensure every vertex in the sequence follows another vertex and is also being followed. Constraint 3 prevents pairing of vertices, but allows formation of sub-tours of three or more vertices. Minimization using methods other than the above, such as the traveling salesman algorithm, or using other objective criteria, may be performed, for example minimization using a min max criterion. Other constraints on the sequencing may be used; for example, other embodiments may not permit multiple loops.

Sequence module 210 creates for each vertex p in the sequence an offset $\Delta(p)$, which determines the delay between the start of the recovery of the item corresponding to vertex p and that of the item corresponding to the vertex subsequent to vertex p in the sequence. Each item in the sequence (which corresponds to a vertex) starts recovering at a certain time and takes a certain amount of time (which may be predicted with a certain but not complete accuracy) to recover. The offset determines when the next item in the sequence is to start its recovery. In an exemplary embodiment, this offset is a fixed time period designed to allow an item a certain amount of recovery time before the next item starts recovering. It is likely that, after the second item starts, for a period of time both items recover simultaneously; there is overlap in the recovery periods. The offset is associated with each item in the sequence and the sequence is stored as a data structure in a file at network recovery tool 200.

In an exemplary embodiment, the offset for each set in a sequence approximates the time for half the nodes in a recovery set constituting a vertex to recover, and is computed by dividing the metered attempt rate R (computed by back-off computation module 202 or by any other method) by the median of the number of PVCs mastered by each node in the recovery set. This may be described as:

$\Delta(p)=(N\_PVC/R)$ where $\Delta(p)$ is the offset for vertex p, N_PVC is the median taken from the set of values of the number of PVCs mastered by each node in the recovery set, and R is the metered attempt rate R computed by back-off computation module 202. If a vertex in the sequence is an individual node, the median is the number of PVCs mastered by that node divided by two.

In a further embodiment, the offset for each set in a sequence is computed by dividing the greatest number of PVCs mastered by any node in the subset by the metered attempt rate R computed by back-off computation module 202.

Other offset interval methods may be used, not requiring the computation of a formula. For example, one method may start the recovery of a subsequent recovery set after a certain amount of nodes in the currently recovering set have actually recovered.

While an embodiment of the system and method of the present invention describes a system and method for sequencing or ordering the recovery of nodes or sets of nodes, other embodiments of the present invention may sequence devices or objects, or sets of devices or objects, whereby the sequence allows for minimal interference between adjacent vertices in the sequence. Other embodiments of the system and method of the present invention may sequence sets of nodes, objects or devices (or individual items such as nodes, objects or devices) to minimize interference due to operations other than recovery operations. For example, modules existing as software competing for resources in a computer system may interfere with one another; their operations may be sequenced using the system and method of the present invention.

VII. Operation

An exemplary embodiment of the present invention is used when there is a significant failure in network 1. When network 1 is operating normally, no recovery is needed. When only a small number, e.g., two, nodes need to recover, recovery interference occurring between those two nodes is minimal, and the nodes may be allowed to recover simultaneously. When a larger number of nodes, for example the majority of the nodes in network 1, need to recover, each node's recovery process may interfere with the recovery processes of numerous other nodes and the cumulative effect of the recovery processes of the nodes slows the overall recovery process.

In an exemplary embodiment of the present invention, various modules implement various functions. Not all functions described need to be performed for all network outages. In alternate embodiments, not all functions need to be implemented, and may be implemented in different manners. For example, a user, rather than alarm processor module 206, may input information on error conditions. Rather than using sequence module 210, the nodes may be partitioned by extract/partition module 205, and recovery may then take place using this partition without a sequence.

In an exemplary embodiment of the present invention only nodes affected by a failure participate in recovery. Alarm processor module 206 inputs alarms or failure signals from network components (e.g., nodes). Alarm processor module 206 determines a set of nodes for which recovery is required. Communication between alarm processor module 206 and network components takes place using equipment at NOC 2. Alternately, alarm processor module 206 may accept input from a human operator to determine the set of nodes for which recovery is required.

In an exemplary embodiment of the present invention, after one or more of modules 202, 204, 205, and 210 create parameters for the recovery of the nodes of network 1, script generator module 212 creates a script containing commands directing the recovery of affected nodes. The script comprises a sequence of commands to direct the recovery of the nodes which need to recover. The script may contain, for example, instructions dictating a metered rate, a back-off or rerouting interval or a set of times at which certain nodes or sets of nodes are to recover. For example, the script may contain a set of commands directing that a first set of nodes recover starting at time A, a second set of nodes recover starting at time B, etc.

Inputs to script generator module 212 vary depending on which of the other modules are run. For example, if a partition is created but no sequence is created, script generator module 212 directs that each recovery set recover completely before another recovery set starts recovery; in such a case the sequence of the recovery of the recovery sets is irrelevant. If a sequence of nodes, not sets, is created, sequence generator module 212 directs that each node recover as dictated by the sequence and timing information created by sequence module 210. In alternate embodiments of the present invention, the coordination of nodes may take place without a script or a script generator; for example, recovery information may be entered to nodes which then direct their own recovery.

In an exemplary embodiment, the script comprises commands to individual nodes; each node requiring recovery has associated commands within the script. The commands are UNIX shell scripts which accept input parameters, create Simple Network Management Protocol (SNMP) messages, and send the SNMP messages to the relevant nodes. Controlling nodes in a network using SNMP is well known. The commands may be in a form such as "StartReroute -n Node -t [Time, Now] -r Rate"; which causes a node "Node" to start a reroute either at a specified time "Time" or, if "Now" is input, when the command is received; the node uses "Rate" as the reroute rate; this is the rate R computed by back-off computation module 202. In alternate embodiments the script may be any language or method of communicating with nodes; for example the script may comprise SNMP messages.

Figure 3:
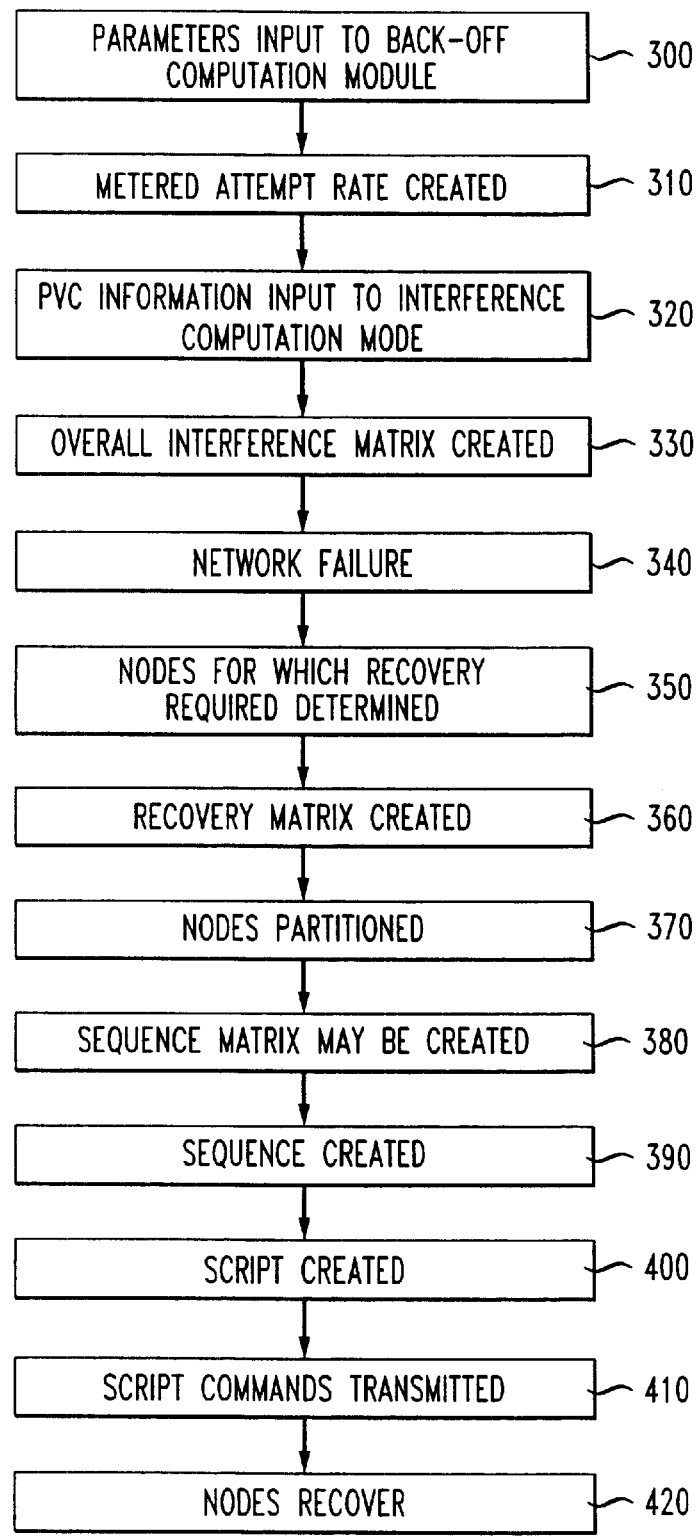
FIG. 3 is a flow chart illustrating the operation of the network recovery tool of FIG. 1 according to an embodiment of the present invention.

FIG. 3 is a flow chart illustrating the operation of network recovery tool 200 of FIG. 1 according to an embodiment of the present invention. While an exemplary embodiment is described with reference to a certain sequence of steps, other sequences of steps may be used to achieve other embodiments of the system and method of the present invention. Alternate embodiments of the present invention may not perform all steps described. For example, recovery sets may recover separately, and sequencing may thus not be performed, or recovery may take place with respect to individual nodes, and recovery sets may not be formed.

Referring to FIG. 3, in step 300, back-off computation module 202 requests an operator to input to back-off computation module 202 background processor utilization $\beta$ average number of hops h, and reroute resource consumption c. Alternately, other methods may be used to gather these parameters; for example, back-off computation module 202 may query each node in network 1 for the set of values required to produce the reroute rate.

In step 310, back-off computation module 202 (FIG. 1) adjusts occupancy $\rho$ on a scale of 0 to 1 to maximize good-put and created metered attempt rate R; back-off computation module 202 records metered attempt rate R at computer system 130 (FIG. 2). Metered attempt rate R is stored for use in the event of a network failure. Steps 300 and 310 may be performed periodically, for example once a month, and are ideally performed before a major network disruption occurs. In an exemplary embodiment, back-off computation module 202 is started at the initiation of a human operator.

In step 320, interference computation module 204 (FIG. 1) accepts a representation of all PVCs in network 1. In an exemplary embodiment, a representation of all PVCs in network 1 is stored as a list of PVC entries, each PVC entry containing a list of its component nodes, in a database (not shown) at NOC 200 (FIG. 1). This database is updated by messages sent from master nodes when a PVC is added, deleted or altered. Interference computation module 204 uses this database to create a data structure representing, for each node pair having a first and second node, how many logical connections mastered by the first node include the second node.

In step 330, interference computation module 204 creates overall interference matrix 220. In an exemplary embodiment, overall interference matrix 220 is a data structure representing a matrix having each node in network 1 on both the x-axis and y-axis, where each entry in the matrix is the sum, over all potential via nodes in network 1, of the product of the number logical connections mastered by a first node which include a given node and the number of logical connections mastered by a second node which include that same given node. In an exemplary embodiment, the interference of a node with itself is undefined or defined with a dummy value. In an exemplary embodiment, overall interference matrix 220 itself is not used during network restoration; instead recovery matrix 222 is created using overall interference matrix 220. Alternate embodiments may use different measures of interference. Methods of creating data structures storing arrays, lists, or other collections of data, storing data structures as files, and passing data structures among modules on a computer system are well known.

In an exemplary embodiment, overall interference matrix 220 is stored for use as a data structure in a file stored at NOC 2 which is available to other modules of network recovery tool 200. Steps 320 and 330 may be performed periodically, for example once a month, and are ideally performed before a major network disruption. In an exemplary embodiment, interference computation module 204 is started at the initiation of a human operator.

In step 340 a network failure occurs affecting a large number of nodes. For example, a power outage or a software fault in a new release may make inoperative a large number of nodes and links, affecting a large portion of the PVCs in network 1.

In step 350 alarm processor module 206 determines a set of nodes for which recovery is required. Alarm processor module 206 inputs alarms or failure signals from network components (e.g., nodes). Communication between alarm processor module 206 and network components takes place using equipment at NOC 2 which is not affected by a network failure; for example by satellite. Alarm processor module 206 may accept input from a human operator to determine the set of nodes for which recovery is required. The set of nodes requiring recovery is placed in a data structure and stored in a file at NOC 2 which is available to extract/partition module 205 (FIG. 1) and other models in network recovery tool 200.

In step 360 extract/partition module 205 creates recovery matrix 222 indicating the interference between nodes requiring recovery. Extract/partition module 205 reads overall interference matrix 220 and the set of nodes for which recovery is required which are stored in files at NOC 2. Dummy nodes are added to the set of nodes for which recovery is required so that the total number of recovery nodes, actual and dummy, is a power of two; the number of nodes in the augmented set is the smallest number which is a power of two and which is greater than or equal to the number of nodes in the set of nodes for which recovery is required. Using overall interference matrix 220 and the set of nodes requiring recovery, extract partition module 205 creates recovery matrix 222, containing interference measures for the nodes of network 1 for which recovery is required. Unless all nodes require recovery, recovery matrix 222 is a reduced and augmented version of overall interference matrix 220, with each node requiring recovery (and possibly dummy nodes) represented on both the x and y axes. In an exemplary embodiment, extract/partition module 205 is started at the initiation of a human operator.

Extract/partition module 205 augments recovery matrix 222. In an exemplary embodiment of the present invention the measure of interference between a node and itself is set to a number much higher than the expected interference, for example 1,000,000. The measure of interference between any dummy node and any non-dummy node is set to a low number, for example 1. In other embodiments other values may be used to fill these positions in recovery matrix 222; for example the likelihood that objects or devices interfere with one another.

In step 370 extract/partition module 205 uses recovery matrix 222 to partition the nodes into recovery sets of nodes. Using recovery matrix 222, extract/partition module 205 partitions the nodes into sets of pairs such that, within each set, the nodes in that set interfere minimally with each other. In an exemplary embodiment, extract/partition module 205 uses a min/max algorithm; other methods may be used to partition the nodes into recovery sets. Depending on a determination made by a human operator providing input to extract/partition module 205, or on a determination made by extract/partition module 205, this process is repeated a certain number of times to combine the sets into larger recovery sets, where the nodes in each set interfere minimally with each other's recovery. The recovery sets are placed in a data structure in a file at NOC 2 which is available to other modules in network recovery tool 200.

In step 380 sequence module 210 (FIG. 1) creates sequence matrix 224 for the sequencing; if the items to be sequenced are nodes, recovery matrix 222 may be used. Sequence module 210 accepts a description of the items to be sequenced (i.e., recovery sets or the set of nodes requiring recovery). In an exemplary embodiment, a data structure containing recovery sets or set of nodes requiring recovery is read from a file stored at network recovery tool 200. In an exemplary embodiment, sequence module 210 is started at the initiation of a human operator.

In step 390 sequence module 210 uses sequence matrix 224 to create a sequence of vertices such as nodes or sets. In an exemplary embodiment, sequence module 210 creates a sequence whereby the measure of interference between two adjacent vertices in the sequence (nodes or two sets of nodes) is minimized, using a traveling salesman algorithm. Sequence module 210 inputs metered attempt rate R, created in step 310, and creates for each vertex in the sequence an offset $\Delta(p)$, the delay between the start of the recovery the vertex and that of the subsequent vertex in the sequence. In an exemplary embodiment, the offset for each vertex in a sequence is computed by dividing the median number of PVCs mastered by any node in the subset, or, if the vertex is itself a node, the number of PVCs mastered by the node divided by two, by the metered attempt rate R. The sequence is stored in a file at network recovery tool 200 which is available to other modules in network recovery tool 200.

In step 400 script generator module 212 creates a script, a series of commands in the form of a UNIX shell script which accepts input parameters, creates SNMP messages, and transmits the messages to the relevant nodes. Script generator module 212 (FIG. 1) inputs the sequence created in step 390 to obtain items (e.g., nodes) to which the script is applied, and may input metered attempt rate R, created in step 310. In an exemplary embodiment, script generator module 212 is started at the initiation of a human operator.

In step 410 script generator module 212 executes the script created in step 400 and transmits SNMP messages to the nodes to which the script is directed. Certain commands within the script created in step 400 are relevant to each node that must recover. Script generator module 212 communicates with the nodes by, for example satellite (not shown), or by a land link separate from links carrying traffic (not shown), or by links carrying traffic.

In step 420 the nodes requiring recovery reroute the PVCs as per the script sent in step 410.

VII. Conclusion

Several embodiments of the present invention are specifically illustrated and/or described herein. However, it will be appreciated that modifications and variations of the present invention are covered by the above teachings and are within the purview of the appended claims without departing from the spirit and intended scope of the present invention.

What is claimed is:

1. A method for recovering from a failure in a network, where the network comprises a set of nodes, the method comprising:

creating recovery sets of nodes by minimizing a measure of the interference among nodes within each recovery set;

assigning to each recovery set a recovery start time; and requiring that the nodes of each recovery set start their recovery process at a time not prior to the recovery start time for their respective recovery set.

2. The method of claim 1 where the recovery sets are created by at least the substeps of:
placing each node into a set; and
combining the sets into larger sets, by performing one or more times the step of creating a set of larger sets, where the nodes in a pair of sets are placed in a larger set so that the nodes in the larger set interfere minimally with each other and so that the interference between nodes in each other larger set being created is minimized.

3. The method of claim 2 further comprising:
creating a recovery set sequence of the plurality of recovery sets such that, for the nodes of any given recovery set in the recovery set sequence, the recovery of the nodes of the subsequent recovery set in the sequence, if any, interfere minimally with the recovery of the nodes of the given recovery set.

4. The method of claim 3 further comprising:
creating, for each recovery set in the sequence, a sequence offset, each sequence offset being an estimated amount of time for the associated recovery set to perform a certain percentage of its recovery.

5. The method of claim 2 where the measure of the interference between each pair of nodes in the network is determined as a function of the number of times a first node in the pair and a second node in the pair require access to the same node during recovery.

6. The method of claim 3 where in order to recover each node must communicate with a plurality of via nodes, the method further comprising:
calculating an optimum delay period and requiring each node to recover its paths by, after recovering a first path, waiting the optimum delay period before attempting to recover a second path.

7. The method of claim 6 where each recovery set includes only nodes affected by a network failure.

8. The method of claim 6 where each node has a set of paths, each node includes at least a processor, each processor having an occupancy, and the delay period is calculated as a function of:
a measure of the average processor occupancy per node;
an average length for each path in the network; and
an average processor resource consumption per reroute attempt.

9. The method of claim 1 where in order to recover each node must communicate with a plurality of via nodes, the method further comprising:
calculating an optimum delay period and requiring each node to recover its paths by, after failing to recover a path, waiting the optimum delay period before reattempting to recover a path.

10. A network carrying traffic, comprising:
a plurality of nodes, each node owning a set of paths, each path comprising a set of via nodes; and
a plurality of recovery sets of nodes of the network, such that the nodes of each recovery set interfere minimally with the recovery of each other, where the nodes in each recovery set start their recovery operations at substantially the same time, and where the nodes in each recovery set start their recovery operations at a substantially different time from the nodes of any other recovery set.

11. The network of claim 10, further comprising:
an interference data structure containing, for each pair of nodes in the network, a measure of recovery interference between the pair of nodes.

12. The network of claim 11 further comprising:
a recovery set sequence of the plurality of recovery sets such that, for the nodes of any given recovery set in the recovery set sequence, the recovery of the nodes of the subsequent recovery set in the sequence, if any, interfere minimally with the recovery of the nodes of the given recovery set.

13. The network of claim 12 where:
each node recovers by attempting to communicate with nodes acting as via nodes; and
the measure of recovery interference for each pair of nodes is created by summing, for each via node, a measure of the interference between a first node in the pair and a second node in the pair which results from the first node and the second node competing for access to the via node.

14. A method for calculating the measure of interference between objects in each pairwise combination of objects in a set of objects, the interference being created by the objects' competing for access to resources in a set of resources, the method comprising:
for each pairwise combination from the set of objects, producing a sum, by summing, for each resource in the set of resources, a measure of the interference between a first object in the pairwise combination and a second object in the pairwise combination which results from the first object and the second object competing for access for the resource.

15. The method of claim 14 where the measure of the interference is determined from the number of times the first object and the second object require access to the resource.

16. The method of claim 15 where the measure of the interference is determined by summing the number of times the first object and the second object require access to the resource.

17. The method of claim 15 where the measure of the interference is determined by multiplying the number of times the first object and the second object require access to the resource.

18. The method of claim 16 where:
the objects are a set of nodes in a network;
the network includes paths;
the resources are a set of nodes in the network; and
the objects require access to the resources to recover paths.

19. The method of claim 17 where:
the objects are a set of nodes in a network;
the network includes paths;
the resources are a set of nodes in the network; and
the objects require access to the resources to recover paths.

20. The method of claim 15 further comprising:
partitioning the set of objects into a plurality of partition sets of objects, the objects in each partition set having a minimal measure of interference with the other objects in the partition set.

21. The method of claim 20 where the measure of the interference is determined by multiplying the number of times the first object and the second object require access to the resource, the objects are a set of nodes in a network and the resources are a set of nodes in the network, and where the objects undertake recovery processes, the method further comprising:
assigning to each partition set a recovery start time; and
requiring that the objects of each partition set start their recovery processes at a time not prior to the recovery start time for that partition set.

22. The method of claim 20 where the measure of the interference is determined by adding the number of times the first object and the second object require access to the resource, the objects are a set of nodes in a network and the resources are a set of nodes in the network, and where the objects undertake recovery processes, the method further comprising:

assigning to each partition set a recovery start time; and requiring that the objects of each partition set start their recovery processes at a time not prior to the recovery start time for that partition set.

23. The method of claim 20 further comprising:

creating an at least one partition set sequence of the partition sets such that each partition set in the at least one partition set sequence interferes minimally with the recovery of the subsequent partition set in the at least one partition set.

24. A method for setting a timing limit on the activities of a set of objects performing activities to minimize interference among objects, the method comprising:

determining, from the characteristics of the set of objects, an optimum rate wherein the objects are nodes in a network;

creating recovery sets of nodes by minimizing a measure of the interference among nodes within each recovery set;

assigning to each recovery set a recovery start time; and requiring that the nodes of each recovery set start their recovery process at a time not prior to the recovery start time for their respective recovery set so that each object performs its activities at the optimum rate.

25. The method of claim 24 where the characteristics include at least an average amount of time it takes for each object to perform a unit of activity.

26. The method of claim 24 where the objects are nodes in a network, the network includes a plurality of paths, and the activities are attempts to reroute paths in the network.

27. The method of claim 26 where each node includes at least a processor, each processor having an occupancy, and where the characteristics include at least:

a measure of the average processor occupancy per node;

an average length for each path in the network; and an average processor resource consumption per reroute attempt.

* * * * *